United States Patent Office 3,298,971
Patented Jan. 17, 1967

3,298,971
MALEIC ANHYDRIDE-TERTIARY AMINE
ADDUCT FOAMING AGENT
William R. Davie, Aliquippa, Pa., assignor, by mesne assignments, to United States Steel Corporation, Pittsburgh, Pa., a corporation of Delaware
No Drawing. Filed May 21, 1963, Ser. No. 282,120
9 Claims. (Cl. 260—2.5)

This application is a continuation-in-part of application Serial No. 181,335, filed May 17, 1963, now U.S. Patent 3,210,651 and entitled "Maleic Foams."

This invention relates to the foaming of plastic materials.

It has previously been proposed to prepare porous products from rubber or polyvinyl chloride by employing as a blowing agent a mixture of maleic anhydride and a rubber recelerator having the grouping.

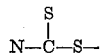

Beaver Patent 2,746,939.

In Parker Patent 2,957,831 polyurethane foams are prepared in the presence of water, either free or latent, e.g., in a hydrated salt. Delayed foaming action is obtained by adding a mixture of an acid anhydride, e.g. maleic acid and a tertiary amine. The foaming itself is carried out initially at room temperature and the water is employed as the foaming agent.

It is an object of the present invention to develop a novel method of foaming a polymer.

Another object is to prepare foams from coal tar pitch and other pitches and asphalts.

A further object is to prepare novel foaming compositions.

Yet another object is to prepare foaming compositions containing a latent foaming agent.

An additional object is to prepare novel maleic anhydride adducts.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing novel adducts of maleic anhydride with a tertiary amine. These aducts decompose at elevated temperatures, e.g., 100° C. and the maleic anhydride portion of the adducts forms gaseous materials such as carbon dioxide. Thus, the adduct is useful as a blowing agent in plastic and elastomeric compositions.

The formation of an adduct of the present type appears to be unique with maleic anhydride since maleic acid, salts of maleic acid and fumaric acid do not form such an adduct. Phthalic anhydride and acetic anhydride also did not form an adduct with tertiary amines nor did they decompose with evolution of gas at elevated temperatures in the presence of a tertiary amine.

The adducts of the present invention are dark colored as are their solid decomposition products formed in the foaming reaction. Consequently, the foamed plastic and elastomeric products produced are dark colored. The foamed products are useful as building insulation, acoustic tiles, package insulation, etc.

It is also critical that the amine be a tertiary amine since primary and secondary amines are ineffective. The tertiary amine must be basic but can contain other substituents as will be evident from the specific amines set forth below.

The maleic anhydride-tertiary amine adduct is preferably formed in the presence of a solvent. Suitable solvents include aromatic hydrocarbons, such as benzene, xylene and ethyl benzene. The xylene can be any of the three isomers, i.e., ortho, meta or para, or a mixture of such isomers. Also, mixtures of benzene with xylene or other liquid aromatic hydrocarbon, can be employed as a solvent.

With the more reactive tertiary amines the reaction temperature should be kept below 60° C. even when a solvent is employed whereas, with less reactive tertiary amines, the adduct can be formed in the presence of the solvent at temperatures up to 130° C.

It has been found that the adduct is formed in a ratio of 1 mole of maleic anhydride for each mole of tertiary nitrogen atom, e.g., 2 moles of maleic anhydride with 1 mole of triethylene diamine.

If the tertiary amine contains another group, e.g., a primary or secondary amino group or an alcoholic group, which is capable of reacting with an anhydride, then the maleic anhydride desirably is maintained in excess throughout the reaction to form the adduct. Otherwise, a portion of the maleic anhydride will be required to form maleamic acids or mono esters, for example, and the adduct will not be formed until maleic anhydride is added in amount to satisfy the reactive groups present. As is evident, this is wasteful of the maleic anhydride for its intended purpose.

Illustrative of tertiary amines which have such reactive groups are N-hydroxyethyl morpholine, 3-amino-1,2,4-triazole, dimethylaminoethanol, N,N-dimethyl-1,3-propanediamine, scopolamine, 2-mercaptobenzothiazole, N,N-diethyl ethylenediamine, and triethanolamine.

Tertiary amines which do not contain reactive substituents and which can be used with maleic anhydride in a solvent with either reactant being in excess or with the reactants being used in equivalent amounts include tertiary alkyl and alkenyl amines, e.g., triethylamine, tripropylamine, tris cyclohexyl amine, triisopropylamine, tributylamine, triamylamine, tristearylamine, trioleylamine, tris decylamine, aralkylamines, e.g., N,N-dimethyl benzylamine, N,N-dibutyl benzylamine, aromatic amines, e.g., N,N-dimethyl aniline, N,N-dihexyl aniline, N,N-diethyl aniline, triphenyl amine, N,N-dimethyl toluidine, dimethylaminomethyl phenol, heterocyclic amines, e.g., hevamethylene tetramine, pyridine, quinoline, B-picoline, 2,4-lutidine, 2,6-lutidine, trimethyl pyridine, 2-methyl-5-ethyl pyridine (collidine), 2-vinyl pyridine, 4-vinyl pyridine, N-methyl piperidine, N,N'-dimethyl piperazine, codeine, morphine, nicotine, 2-n-amyl quinoline, 6,7-dimethoxyisoquinoline, papaverine, cocaine, tropinone, N-methyl pyrrolidine, N-butyl pyrrole, 3,5-dibenzyl pyridine, N-ethyl morpholine; substituted guanidines, e.g., tetramethyl guanidine, tetraphenyl guanidine, tetraethyl guanidine. Anion exchange resins which contain tertiary amine groups can also be used as the amine.

The plastic or elastic materials which can be foamed according to the invention include bituminous materials including coal tar pitch, refined coal tar, coal tar fractions, such as the road tars, phenolic pitch, petroleum pitch, aromatic petroleum pitches, pyrobitumen, straight run asphalt, blown asphalt, cracked asphalt, aromatic asphalt, polymerized asphalt, gilsonite, extract bitumen. Also, there can be used natural and synthetic rubbers, e.g., natural rubber, Butyl rubber (isobutylene-isoprene copolymer 97:3 ratio), rubbery butadiene styrene copolymer (60:40 ratio and 75:25 ratio), butadiene acrylonitrile copolymer (75:25 ratio), neoprene (polychloroprene), butadiene-vinyl pyridine copolymer (75:25 ratio), synthetic resins, e.g., acrylonitrile-butadiene-styrene (ABS), polystyrene, nylon (a fibre-forming synthetic linear polycarbonamide having recurring carbonamide groups as an integral part of the polymer chain, which groups are separated by at least two carbon atoms) (e.g., polyhexamethylene adipamide), polyethylene (high, medium or low density), polypropylene, polyvinyl chloride, polycarbonates (e.g., from bisphenol A and diphenyl carbonate), Saran, e.g., vinylidene chloride-acrylonitrile (80:20) and vinylidene chloride-vinyl chloride (85:15), polyvinyl acetals, e.g., polyvinyl formal, polyvinyl butyral, polyoxymethylene (Delrin), vinyl chloride-vinyl acetate copolymer (87:13), polymers of ethyl acrylate, methyl acrylate, butyl acrylate and octyl acrylate, polyvinyl acetate, vinyl acetate-ethyl acrylate.

The plastic material should not be so fluid at the temperature at which the maleic anhydride-tertiary amine adduct decomposes that the bubbles break as they are formed.

Unless otherwise indicated, all parts and percentages are by weight.

The maleic anhydride-tertiary amine adduct can be used in an amount of 0.2 to 20% and higher, e.g., up to 50% of the total formulation in foaming plastic materials, and generally it is employed in an amount between 1 and 10%, and preferably between 2 and 6% of the total formulation.

The blowing is normally accomplished at a temperature of 100°–180° C., although higher temperatures can be employed, e.g., 200° C. and above.

*Example 1*

Maleic anhydride was dissolved in benzene to form a 20% solution and a small amount of pyridine was added at room temperature. There was no immediate violent reaction. There was only a very slow color change and after about 8 hours a dark brown or black precipitate was formed.

The use of more pyridine in another run at room temperature gave a larger volume of precipitate. It was found that even if the pyridine was used in excess only 1 mole of pyridine reacted with 1 mole of maleic anhydride.

*Example 2*

Using a much stronger base, namely, triethylene diamine in the procedure of Example 1 with a 20% solution of maleic anhydride in benzene, there was immediate formation of dark color and at room temperature the reaction was complete within about 2 hours. The weight of the insoluble dark brown or black solid formed corresponded to the reaction of 1 mole of maleic anhydride with each tertiary nitrogen atom. This was essentially a quantitative reaction.

In a run on a large scale the reaction was found to be very slightly exothermic at room temperature when 1 mole of triethylene diamine was added to a 20% solution of 2 moles of maleic anhydride in benzene.

It was found that the reaction in benzene solution between maleic anhydride and triethylene diamine started to evolve gas above 60° C. and, hence, the temperature should be kept below this temperature during the reaction. In contrast, the less reactive pyridine barely caused gas evolution at about 130° C. when added in an amount of 1 mole to 1 mole of a 20% solution of maleic anhydride in xylene.

The dark brown or black solids obtained in Examples 1 and 2 were isolated by filtration, washing with benzene and drying at low temperature, e.g., room temperature. The solid products were insoluble in benzene and soluble in acetone. The solid products were also soluble in water and methyl alcohol with a rapid evolution of gas occurring as the products were dissolved.

The solid adduct from the reaction of triethylene diamine and maleic anhydride when added to xylene at 130° C. decomposed rapidly with evolution of a gas, while the reaction product from pyridine and maleic anhydride decomposed but more slowly, also with evolution of a gas in xylene at 130° C. Under these conditions the dark brown or black solids did not dissolve in the hot xylene, and after the gas evolution was completed, there was still an insoluble dark brown solid present which was acidic and highly water soluble, soluble in acetone and insoluble in aromatic hydrocarbons.

After the dark brown or black solid decomposes to produce the gas apparently it frees the amine so that more maleic anhydride can be decomposed.

In an experiment the brown solid adduct from maleic anhydride and triethylene diamine was heated in xylene until gas evolution stopped. Then, addition of more maleic anhydride caused gas evolution to start again.

*Example 3*

95% of polyethylene was foamed with 5% of the maleic anhydride-triethylamine adduct in the extruder at 325° F. The foamed polyethylene had a very uniform cell structure and had a black color.

*Example 4*

90% of polyethylene was foamed with 10% of the maleic anhydride-triethylene diamine adduct in the extruder at 325° F. to give a black foamed polyethylene having a uniform cell structure.

*Example 5*

The maleic anhydride adduct of triethylene diamine was prepared by adding 4 grams of triethylene diamine to a room temperature solution of 14 grams (an excess) of maleic anhydride dissolved in 80 cc. of benzene. There was immediate color formation and within a few minutes a precipitate began to form. After about 2–3 hours the brown precipitate was filtered off, washed with benzene and dried at a low temperature, i.e., room temperature. The yield was 11 grams which was almost exactly the weight expected if two moles of maleic anhydride reacted with one mole of the diamine.

*Example 6*

When replacing the triethylene diamine by pyridine in Example 5 the reaction was slower due to the lower basicity of the amine and the yield was lower due to the greater solubility of the adduct product in benzene.

*Example 7*

Maleic anhydride-pyridine adduct in an amount of 5% concentration with 95% of polyethylene foamed the polyethylene in the extruder at 325° F.

The polyethylene used in the examples was a low density polyethylene (Alathon 14, density 0.915 molecular weight 20,000).

*Example 8*

10 parts of maleic anhydride-hexamethylene tetramine adduct (containing 4 moles of maleic anhydride to 1 mole of hexamethylene tetramine) were added to 90 parts of polyethylene and the product extruded at 350° F. to give a dark foamed product.

*Example 9*

Coal tar pitch, specifically, hotline pitch (ring and ball softening point of about 120° C.) was mixed with 10% by weight of maleic anhydride-triethylene diamine adduct and the mixture extruded at 325° F. to give a black foamed product.

*Example 10*

To 100 parts of a polyvinyl chloride plastisol (made from 62.5% of polyvinyl chloride, Geon 101, and 37.5% dioctyl phthalate) there were added 10 parts of maleic anhydride-pyridine adduct and the mixture heated to 392° F. for 15 minutes to give a black foamed product.

*Example 11*

Polystyrene was foamed at 212° F. using the adduct of maleic anhydride and triethylene diamine.

The preferred tertiary amines are composed of carbon, hydrogen and nitrogen. The tertiary amine can also have oxygen in the molecule. Preferably, the tertiary amine has no groups reactive with maleic anhydride other than the tertiary amino group or groups.

*Example 12*

When a benzene soluiton (e.g., a 20% solution) of diethylamino ethanol is added to a benzene solution (e.g., a 20% solution) of maleic anhydride (the maleic anhydride being at all times in excess), even with cooling to room temperature, a chocolate brown reaction mixture is formed, i.e., an adduct of the type of the present invention.

If, however, the benzene solution of maleic anhydride is added to the benzene solution of diethylamino ethanol (the amine being in excess at all times), and if the molar amount of maleic anhydride is not greater than the amine, an essentially colorless product results.

As stated, if the amino compound contains only tertiary amino groups and no other reactive groups, the mode of addition of maleic anhydride is not important but temperature and concentrations are very important. At high temperatures and concentrations violent decomposiiton of maleic anhydride occurs, as described in the parent application. At low temperatures, e.g., room temperature to 60° C., and low concentrations, e.g., below 30% in an inert organic solvent, controllable formation of the dark colored adducts of the present invention occurs.

What is claimed is:

1. A foamable composition comprising a plastic or elastomer selected from the group consisting of asphalt, pitch, bitumen, tar, natural rubber, rubbery copolymer of isobutylene and isoprene, rubbery butadiene styrene copolymer, butadiene acrylonitrile copolymer, polychloroprene, butadiene-vinyl pyridine copolymer, acrylonitrile-butadiene styrene terpolymer, polystyrene, a fiber-forming synthetic linear polycarbonamide having recurring carbonamide groups as an integral part of the polymer chain, which groups are separated by at least two carbon atoms, polyethylene, polypropylene, polyvinyl chloride polycarbonates, vinylidene chloride-acrylonitrile copolymer, vinylidene chloride-vinyl chloride copolymer, polyvinyl acetals, polyoxymethylene, vinyl chloride-vinyl acetate copolymer, ethyl acrylate polymer, methyl acrylate polymer, butyl acrylate polymer, polyvinyl acetate and vinyl chloride-ethyl acrylate copolymer and as a foaming agent an adduct of maleic anhydride and an amine having at least one tertiary amine group, said adduct containing one mol of maleic anhydride for each tertiary amino group present.

2. A composition according to claim 1 wherein the tertiary amine save for the tertiary amine groups is inert to maleic anhydride.

3. A composition according to claim 1 wherein the amine is hydrocarbon except for the tertiary amine group nitrogen atoms, there being 1 mole of maleic anhydride in the adduct for each tertiary amino group present.

4. A composition according to claim 1 wherein the adduct is an adduct of 2 moles of maleic anhydride with 1 mole of triethylene diamine.

5. A composition according to claim 1 wherein the adduct is an adduct of 4 moles of maleic anhydride with 1 mole of hexamethylene tetramine.

6. A composition according to claim 1 wherein the adduct is an adduct of 1 mole of maleic anhydride with 1 mole of pyridine.

7. A process of producing a foam comprising heating the mixture of claim 1 and extruding said heated mixture.

8. A process according to claim 7 wherein the plastic or elastomer is selected from the group consisting of polyethylene, polystyrene, coal tar pitch and polyvinyl chloride.

9. A foamable composition according to claim 1 wherein the plastic or elastomer is selected from the group consisting of polyethylene, polystyrene and polyvinyl chloride.

References Cited by the Examiner

UNITED STATES PATENTS

| 2,746,393 | 5/1956 | Beaver | 260—2.5 |
| 2,750,389 | 6/1956 | Pingree et al. | 260—295 |
| 2,751,389 | 6/1956 | Bersworth | 260—295 |
| 2,957,831 | 10/1960 | Parker | 260—2.5 |

MURRAY TILLMAN, *Primary Examiner.*

M. F. FOELAK, *Assistant Examiner.*